UNITED STATES PATENT OFFICE 2,441,498

ALKYL GLYCINANILIDES

Nils Magnus Löfgren and Bengt Josef Lundqvist, Stockholm, Sweden, assignors to Aktiebolaget Astra, Apotekarnes Kemiska Fabriker, Sodertalje, Sweden, a joint-stock company of Sweden No Drawing. Application July 12, 1944, Serial No. 544,648. In Sweden July 15, 1943

6 Claims. (Cl. 260—562)

This invention relates to a novel class of organic compounds which are specially useful as anesthetics, more especially local anesthetics. More particularly the invention relates to compounds of the class amino acyl anilides having two or three aliphatic hydrocarbon residue substituents in the benzene nucleus.

We have found that anilides having the general formula:

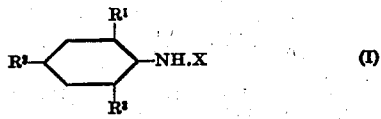

in which $R^1$ and $R^3$ represent aliphatic hydrocarbon residues, and $R^2$ represents hydrogen or an aliphatic hydrocarbon residue, and in which X represents an acyl group which contains at least one primary or secondary amino residue, as well as salts of such anilides, possess very valuable local anesthetic properties.

The new compounds according to the present invention have a comparatively low toxicity in comparison to their efficiency. Furthermore, they are very quick-acting, and they may be used without an addition of vaso-constrictors. Aqueous solutions of their salts are very stable, and they give very stable solutions with adrenaline.

The method according to the invention of producing these new anesthetics comprises, in general, reacting two compounds of the general formulas:

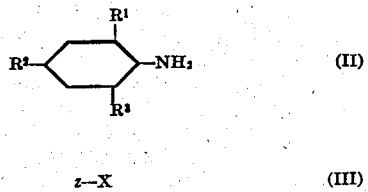

and $$z-X \qquad (III)$$

where $R^1$, $R^2$ and $R^3$ and X have the same significance as given above, and $z$ represents an atom group—which term shall be interpreted to include a group consisting of a single atom—which together with the $NH_2$-group in the compound II is capable of forming an amido residue, with one another to form a compound of the Formula I above given. The compound thus produced is then converted into a salt, if desired.

The process may be carried out in such manner that a disubstituted or trisubstituted phenyl amine of the Formula II, or a salt thereof, is first caused to react with a compound of the Formula III consisting of a halogen carboxylic acid, or a halide or an amide of such an acid, and in which $z$ thus represents either the group OH, or a halogen atom, or the group $NH_2$, to form a halogen carboxylic acyl anilide, which is then treated with a primary or secondary amine to form a compound of the Formula I above given.

The phenyl amine II as such, or in the form of its hydrochloride, may be caused to react with a halogen carboxylic acid, such as chloracetic acid, chlorpropionic acid, preferably in the presence of a condensation medium, such as phosphorus pentoxide, thionyl chloride, or a phosphorus halide, such as phosphorus pentachloride, phosphorus trichloride, or phosphorus oxychloride. The phenyl amine II may also be reacted with a halogen acyl halide, such as chloracetyl chloride, α-bromopropionyl bromide, β-chlorpropionyl chloride, α,β-dibromopropionyl chloride, α-bromophenyl-acetic acid bromide, and so forth, the reaction being preferably performed in the presence of a solvent, for instance glacial acetic acid, acetone, dioxane, ether, chloroform, benzene, and so forth. For forming the halogen carboxylic acid anilide a halogen acyl amide, for instance chloracetyl amide, may also be used, and in this case, instead of the phenyl amine of the Formula II, a salt of the amine, particularly the hydrochloride thereof, is used for the reaction which is preferably carried out by melting the components together.

Among primary or secondary amines which may be used for converting the halogen carboxylic acid anilide into the compound I the following may be mentioned: Aliphatic amines, such as methyl amine, dimethyl amine, diethyl amine, butyl amine, allyl amine, and alicyclic amines, such as cyclohexyl amine, as well as isocyclic amines, such as aniline, benzyl amine, 1,2,3,4-tetrahydro-2-naphtyl amine, and further, heterocyclic amines, such as piperidine, tetrahydro-isoquinoline, amino-quinolines, and amino-thiazoles. The reaction is preferably carried out in an organic solvent free from water, such as benzene or xylene.

The compounds according to the present invention are preferably used as local anesthetics in the form of their salts with organic or inorganic acids, such as tartaric acid, citric acid, or hydrochloric acid. The hydrochlorides of the compounds are particularly suitable.

The following examples describing the preparation of various compounds according to this invention will serve for illustrative purposes:

A. By reaction of phenyl amine with halogen acyl halide.

*Example 1.—ω-diethylamino-2,6-dimethylacetanilide*

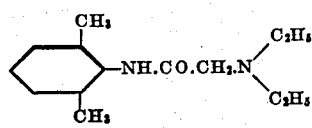

One mole 2,6-xylidine is dissolved in 800 ml.

glacial acetic acid. The mixture is cooled to 10° C., after which 1.1 mole chloracetyl chloride is added at one time. The mixture is stirred vigorously during a few moments after which 1000 ml. half-saturated sodium acetate solution, or other buffering or alkalizing substance, is added at one time. The reaction mixture is shaken during half an hour. The precipitate formed which consists of ω-chloro-2,6-dimethyl-acetanilide is filtered off, washed with water and dried. The product is sufficiently pure for further treatment. The yield amounts to 70 to 80% of the theoretical amount.

One mole of the chloracetyl xylidide thus prepared and 2.5 to 3 moles diethyl amine are dissolved in 1000 ml. dry benzene. The mixture is refluxed for 4 to 5 hours. The separated diethyl amino hydrochloride is filtered off. The benzene solution is shaken out two times with 3-n hydrochloric acid; the first time with 800 ml. and the second time with 400 ml. acid. To the combined acid extracts is added an approximately 30% solution of sodium hydroxide until the precipitate does not increase. The precipitate, which sometimes is an oil, is taken up in ether. The ether solution is dried with anhydrous potassium carbonate after which the ether is driven off. The remaining crude substance is purified by vacuum distillation. During the distillation practically the entire quantity of the substance is carried over within a temperature interval of 1° to 2° C. The yield approaches the theoretical amount.

Melting point 68–69° C. Boiling point 180–182° C. at 4 mm. Hg; 159–160° C. at 2 mm. Hg. Molecular weight, calculated for $C_{14}H_{22}ON_2$, 234; found by acidimetric titration, 234.

*Example 2.—ω-diethylamino-2,4,6-trimethyl-acetanilide*

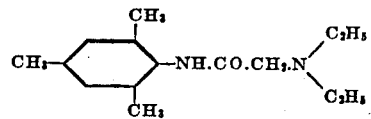

The method of preparing this compound is similar to that above described in Example 1 for preparing ω-diethyl-amino-2,6-dimethyl-acetanilide with the exception that mesidine, i. e. 2,4,6-trimethyl-aniline, is used as a starting material instead of v-m-xylidine.

Melting point 44° C. Boiling point 187° C. at 6 mm. Hg. Molecular weight, calculated for $C_{15}H_{24}ON_2$, 248; found 250.

*Example 3.—Diethyl-amino-2,6-dimethyl-propionyl anilide*

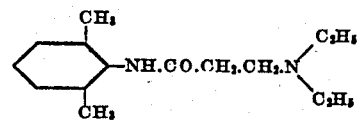

and

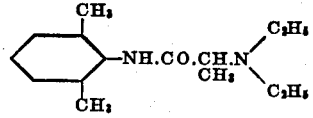

The method of producing these compounds is similar to that used according to Example 1 for the preparation of ω-diethylamino-2,6-dimethyl-acetanilide with the exception that the chloracetyl chloride is replaced by a halogen propionyl halide. For instance, the reaction may be carried out with β-chloropropionyl chloride in which case the final product is β-diethylamino-2,6-dimethyl-propionyl anilide, which is most easily purified by recrystallization from petroleum ether, instead of by vacuum distillation. Melting point 55–56° C. Molecular weight, calculated for $C_{15}H_{24}ON_2$, 248; found 249.

The reaction may also be carried out with α-bromo-propionyl bromide in which case the final product is α-diethylamino-2,6-dimethyl-propionyl anilide. Melting point 54–55° C. Boiling point 173° C. at 3 mm. Hg. Molecular weight, calculated for $C_{15}H_{24}ON_2$, 248; found 249.

*Example 4.—ω-butylamino-2,6-diethyl-4-methyl acetanilide*

Normal:

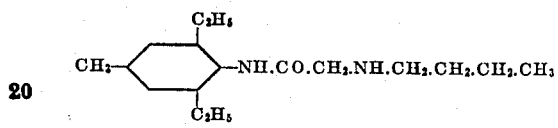

Iso:

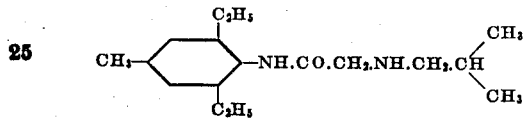

One mole 2,6-diethyl-4-methyl aniline is dissolved in 800 ml. glacial acetic acid. The mixture is cooled to 10° C., after which 1.1 mole chloracetyl chloride is added at one time. The mixture is stirred vigorously during a few moments after which 1000 ml. half-saturated sodium acetate solution, or other buffering or alkalizing substance, is added at one time. The reaction mixture is shaken during half an hour. The precipitate formed is filtered off, washed with water and dried. The product consists of ω-chloro-2,6-diethyl-4-methyl-acetanilide and is sufficiently pure for further treatment. The yield amounts to 70 to 80% of the theoretical amount.

One mole of the compound thus produced is dissolved in 1000 ml. hot xylene. The hot solution is added in three portions with intervals of half an hour to a boiling solution of 3 moles normal butyl amine or isobutyl-amine in 200 ml. xylene in a flask provided with a reflux condenser. The reaction mixture is boiled during a total time of 4 to 5 hours. The separated butyl amino hydrochloride is filtered off, after which the filtrate is shaken out several times with 4-n acetic acid. To the combined acid extracts a 30% sodium hydroxide solution is added until the precipitate does not increase, after which further treatment proceeds as in Example 1.

*Example 5.—ω-cyclohexylamino-2,6-dimethyl-acetanilide*

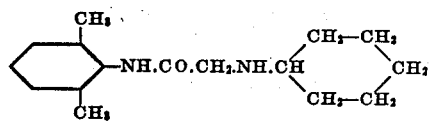

The method of preparing this substance is similar to that described in Example 4 for preparing ω-butylamino-2,6-diethyl-4-methyl acetanilide with the exception that 2,6-xylidine and cyclohexyl amine are used as starting materials instead of 2,6-diethyl-4-methyl aniline and butyl amine, respectively. In this case the crude substance obtained is more easily purified by recrystallization from gasoline, instead of by vacuum distillation.

Melting point 60–62° C. Molecular weight, calculated for $C_{16}H_{24}ON_2$, 260; found 260.

*Example 6.—ω-benzylamino-2,6-dimethyl-acetanilide*

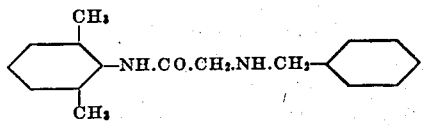

The method of preparing this substance is the same as that used in Example 5 for the preparation of ω-cyclohexylamino-2,6-dimethyl-acetanilide with the exception that benzyl amine is used as a starting material instead of cyclohexyl amine. The crude substance obtained is preferably recrystallized from benzene.

Melting point 102° C. Molecular weight, calculated for $C_{17}H_{20}ON_2$, 268; found 269.

*Example 7.—α-diethylamino-β-diethylamino-2,6-dimethyl-propionyl-anilide*

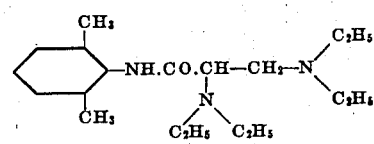

One mole 2,6-xylidine is dissolved in 800 ml. glacial acetic acid. The mixture is cooled to 10° C., after which 1.1 mole α,β-dibromopropionyl bromide is added at one time. The mixture is stirred vigorously during a few moments, after which 1000 ml. half-saturated sodium acetate solution, or other buffering or alkalizing substance, is added at one time. The reaction mixture is shaken during half an hour. The precipitate formed which consists of α,β-dibromo-2,6-dimethyl-propionyl anilide is filtered off, washed with water and dried. The substance is sufficiently pure for further treatment.

One mole of the substance thus prepared and 5 to 6 moles diethyl amine are dissolved in 1000 ml. dry benzene, after which further treatment is effected in the same manner as in Example 1.

B. By reaction of phenyl amine with halogen carboxylic acid, with $P_2O_5$ as condensation medium.

*Example 8.—ω-diethylamino-2,6-dimethyl-acetanilide*

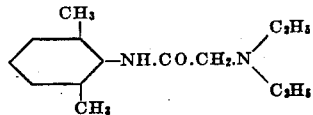

One mole 2,6-xylidine is mixed with 1.1 mole chlor-acetic acid. A yellow mass of crystals is formed while much heat is developed. The mass is mixed with ¼ mole phosphorus pentoxide and is heated on a water bath during 15 minutes. The reaction product is extracted with xylene to which some animal charcoal has been added. From the filtered hot solution, on cooling, ω-chloro-2,6-dimethyl-acetanilide crystallizes which may be recrystallized from xylene, if desired.

One mole of the compound thus prepared and 2.5 to 3 moles diethyl amine are dissolved in 1000 ml. dry benzene, after which further treatment is effected in accordance with Example 1.

Melting point 68–69° C. Boiling point 180–182° C. at 4 mm. Hg. Molecular weight, calculated for $C_{14}H_{22}ON_2$, 234; found 234.

C. By reaction of phenyl amino hydrochloride with halogen carboxylic acid, with phosphorus halide or thionyl chloride as condensation medium.

*Example 9.—ω-piperidino-2-tertiary-butyl-6-methyl-acetanilide*

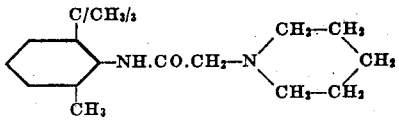

1.5 moles 2-tertiary-butyl-6-methyl-anilinium chloride and 2.1 moles chloracetic acid are melted together at 100–110° C. in a vessel provided with stirring means and reflux condenser, after which 0.74 mole phosphorus trichloride, or an equivalent amount of phosphorus pentachloride, phosphorus oxychloride, or thionyl chloride, is added little by little. The reaction proceeds under development of hydrogen chloride, and is finished when the development of gas ceases and the mass begins to solidify. The mass is then heated during a short time to 150 to 160° C. and is allowed to cool after which the reaction product is immersed in water. The separated product is filtered off, washed with water and dried. The substance which consists of ω-chloro-2-tertiary-butyl-6-methyl-acetanilide may suitably be recrystallized from xylene.

One mole of the substance thus prepared and 2.5 to 3 moles piperidine are dissolved in 1000 ml. dry benzene. The mixture is refluxed for 4–5 hours. The separated piperidino hydrochloride is filtered off. The subsequent treatment is effected in accordance with Example 1. Instead of subjecting the crude substance to vacuum distillation, the purification is in this case performed more simply by recrystallization, for instance from alcohol or benzene.

D. By reaction of phenyl-amino-hydrochloride with halogen acyl amide.

*Example 10.—ω-dimethylamino-2,6-dimethyl-acetanilide*

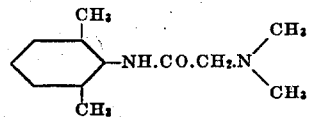

One mole 2,6-xylidinium chloride is intimately mixed with one mole chloracetamide and slowly heated on an oil bath to 120–130° C. The mixture melts at first but solidifies again due to separated ammonium chloride. The heating is continued for one hour. The reaction mass is boiled with xylene to which some animal charcoal has been added. From the filtered hot solution, on cooling, a substance crystallizes which may be recrystallized from xylene, if desired.

One mole of the ω-chloro-2,6-dimethyl-acetanilide thus prepared is dissolved in 1000 ml. dry benzene to which 2.5 to 3 moles dimethyl amine are added. The mixture is heated in a closed vessel at 70° C. for 4 to 5 hours. The separated dimethyl-amino-hydrochloride is filtered off. The subsequent treatment is effected in accordance with Example 1, but the crude final product obtained in this case is most easily purified by recrystallization from xylene instead of by vacuum distillation.

Melting point 77–79° C. Molecular weight, calculated for $C_{12}H_{18}ON_2$, 206; found 206.

We claim:
1. ω-diethylamino-2,6-dimethyl-acetanilide.
2. ω-diethylamino-2,4,6-trimethyl-acetanilide.
3. ω-dimethylamino-2,6-dimethyl-acetanilide.
4. Amino acyl anilides and their salts represented by the following formula for the anilides:

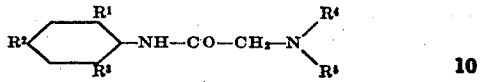

wherein $R^1$ and $R^3$ represent lower alkyl groups, $R^2$ is selected from the group consisting of hydrogen and a lower alkyl group, $R^4$ is selected from the group consisting of hydrogen and a lower alkyl group and $R^5$ is a lower alkyl group.

5. The product of claim 4 wherein $R^1$, $R^2$, $R^3$, $R^4$ and $R^5$ are lower alkyl groups.

6. The product of claim 4 wherein $R^1$, $R^3$, $R^4$ and $R^5$ are lower alkyl groups, and $R^2$ is hydrogen.

NILS MAGNUS LÖFGREN.
BENGT JOSEF LUNDQVIST.

REFERENCES CITED

The following references are of record in the file of this patent:

UNITED STATES PATENTS

| Number | Name | Date |
|---|---|---|
| 543,214 | Majert | July 23, 1895 |
| 2,073,100 | Eisleb | Mar. 9, 1937 |
| 2,139,190 | Iselin | Dec. 6, 1938 |
| 2,145,617 | Adams | Jan. 31, 1939 |
| 2,153,707 | Becherer | Apr. 11, 1939 |

FOREIGN PATENTS

| Number | Country | Date |
|---|---|---|
| 96,607 | Switzerland | Nov. 1, 1922 |
| 196,137 | Switzerland | May 16, 1938 |
| 206,897 | Switzerland | Dec. 1, 1939 |

OTHER REFERENCES

Hans et al.: "Ann. der Chem.," vol. 520, page 1 to 10 (1935).

Erdtmann et al.: "Svensk Kemish Tidskrift," vol. 49, (1937), pages 163 to 174.